Feb. 4, 1941.   H. M. FITCH   2,230,453
AUTOMATIC AUTOMOTIVE AIR FILTER
Filed May 16, 1938   2 Sheets-Sheet 1

Inventor
Howard M. Fitch,

By Arthur H. Robert
Attorney

Feb. 4, 1941.    H. M. FITCH    2,230,453
AUTOMATIC AUTOMOTIVE AIR FILTER
Filed May 16, 1938    2 Sheets-Sheet 2

Inventor
Howard M. Fitch,
By Arthur H Robert
Attorney

Patented Feb. 4, 1941

2,230,453

UNITED STATES PATENT OFFICE 2,230,453

AUTOMATIC AUTOMOTIVE AIR FILTER

Howard M. Fitch, Louisville, Ky., assignor to American Air Filter Company, Inc., Louisville, Ky., a corporation of Delaware Application May 16, 1938, Serial No. 208,160

13 Claims. (Cl. 183—8)

This invention relates to air filters of the liquid reservoir type. While the features of the invention are generally useful, they are particularly suited for use with and hereinafter described as applied to automatic automotive air filters of the character wherein liquid from the reservoir is entrained in the incoming air, and such air then successively passed through a double vortex Cyclone and a filter. For convenience and clarity, the term "double vortex Cyclone" is used to designate that well-known form of mechanical air-cleaning device which is composed of a conical casing open at its smaller lower end and provided at its larger upper end with an axial outlet and an outlying swirl-producing inlet and which compels the air flowing through the casing to form an outer vortex as it travels spirally from the inlet toward the smaller end and then to reverse its direction and form an inner vortex as it travels spirally toward the axial outlet. In structures of this character, the double vortex Cyclone operates to preclean the air by removing lint and most of the granular dust and oil, while the filter medium operates to remove the last traces of dust and oil, the removed filter oil serving to wash the filter and thus keep it coated and clean.

The principal objects of the invention are: to provide a simple and compact arrangement for draining the filter during operation; to minimize the actual and maximize the effective Cyclone height; to prevent particulate matter from by-passing the Cyclone; to provide a compact and effective arrangement for introducing oil from the reservoir into the incoming air and for insuring a thorough mixture of the oil with the air; and to reduce to a minimum the entrainment in and recirculation with the oil of solid particles, which have been previously separated from the air.

A further and important object is to obtain the foregoing objectives in a compact and simply constructed device, which requires a minimum of maintenance attention.

Figure 1:
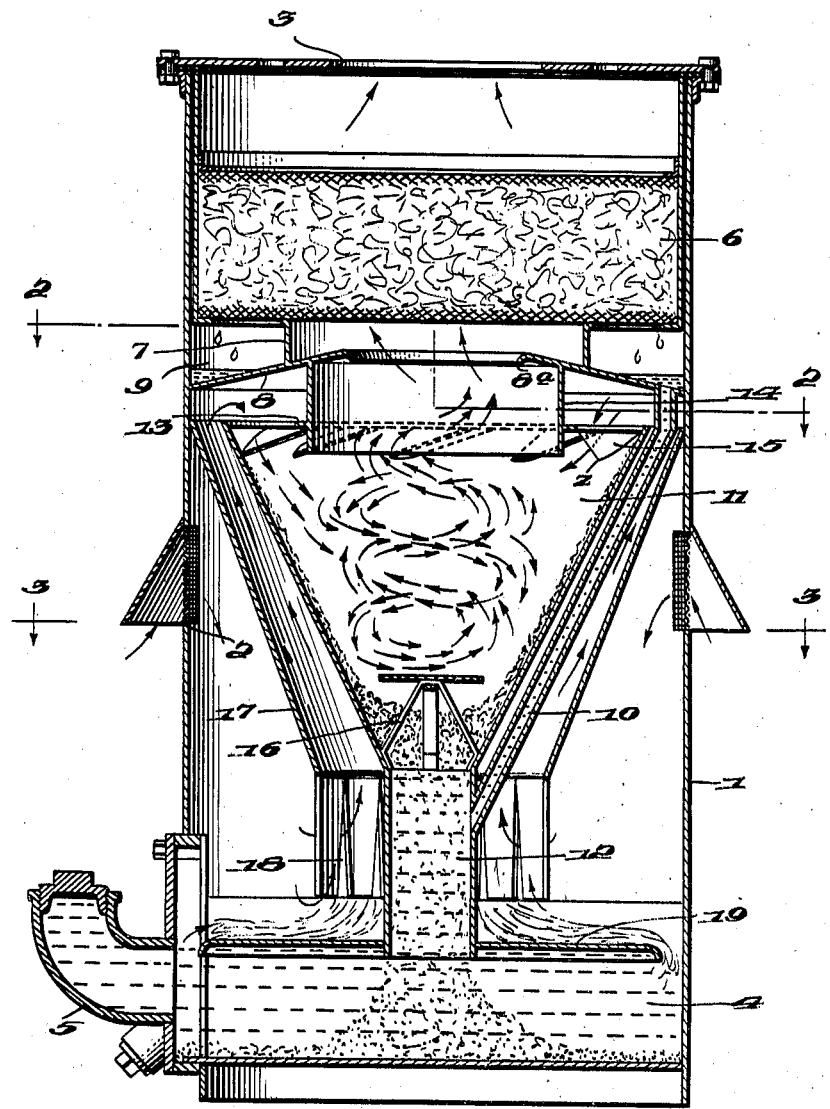

The features of the invention are embodied in an automatic automotive air filter, which is illustrated in the accompanying drawings, wherein:

Figure 1 is a vertical sectional view taken centrally through the device; and

Figure 2:
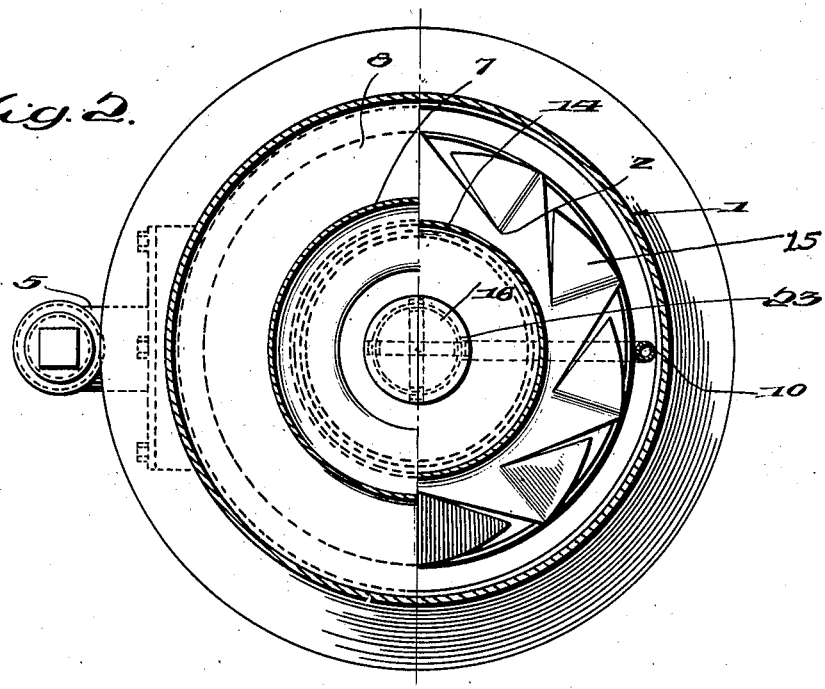
Figure 3:
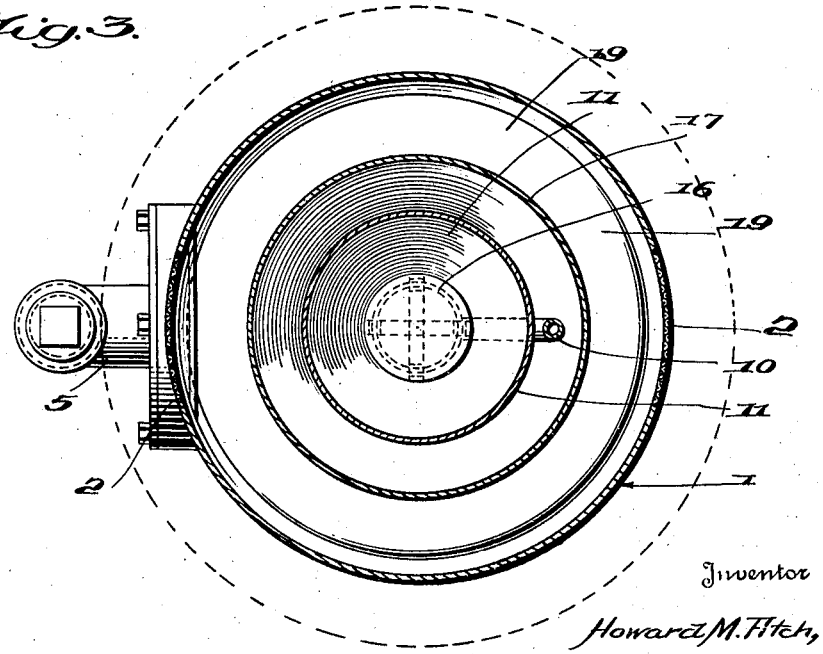

Figures 2 and 3 are horizontal sections, respectively, taken along lines 2—2 and 3—3 of Figure 1.

The air cleaner, used to illustrate the various features of the invention, is of a character having a reservoir in combination with liquid entraining, cycloning and filtering means. As illustrated, such structure includes an exterior housing preferably in the form of a straight metal cylinder 1, having a reservoir section at its bottom, a filtering section at its top, and a cycloning section interposed therebetween. The cycloning section contains an air inlet 2, while an air outlet 3 is provided in the upper end of the filtering section.

The reservoir section of the housing contains a body or bath 4 of oil or of such other liquid as may be used or entrained in the air (or gas) flow. At one side of the oil bath 4, the housing may be provided with a removable cap 5 having normally closed filling and draining connections, the upper end of the filling connection preferably coinciding with the highest level of oil, which is indicated by the solid line.

The filtering section of the housing 1 contains a circularly shaped filter unit 6, of the viscous impingement type, which is horizontally disposed and removably arranged within but closely fitted to the wall of housing 1 with its lower and upper ends respectively communicating with the inlet and outlet openings of the housing. As the air flows upwardly through the filtering section, its entrained oil and dust is deposited upon the filtering surfaces of the unit and thus removed from the air flow. The sweeping action of the air flow prevents the excess of such oil from draining downwardly against the flow and tends to force it laterally toward the circumference of the filter medium. In accordance with a particular feature of this invention, an outer annular portion of the lower end of the filter unit 6 is blanked off from the air flow, by a circular band 7 and a transverse partition 8, to shelter the overlying circumferential portion of the filter medium and thus permit the liquid passing laterally into it to drain downwardly, during operation, into the annular outer chamber 9 formed below the unit by the band 7 and partition 8. This chamber is made to drain into the reservoir in any suitable manner, as by means of pipe 10, which extends from the chamber to a point below the operating level of the reservoir.

The filter unit 6 loosely rests upon the upper end of the circular band 7, the lower end of which is secured to the transversely arranged partition 8. The partition is welded or otherwise rigidly secured at its periphery to the wall of housing 1 and shaped to slope gently upward from its periphery to a central opening, through which air enters the filtering section. The unit 6 is firmly held against the band 7 by extending its circular retaining frame upwardly into abutting relation with the removably secured cover plate of the housing, this plate containing the housing outlet 3.

Where the air flow is apt to contain an appreciable amount of lint or heavy concentrations of other particulate matter including oil, it is highly desirable to preclean it before the filtering operation. Accordingly, a cyclonic separator, of the double vortex Cyclone type, is provided in the cycloning section to centrifuge the air passing between the inlet 2 and the filtering section. This separator includes an open-ended cone-shaped cycloning member or casing 11 having, at its bottom, a downwardly directed axial pipe 12 and, at its top, a horizontal shoulder plate 13 extending from the member 11 radially inward to the customary upwardly directed axial outlet neck 14, all of these parts being welded or otherwise rigidly secured together. The separator is concentrically positioned within housing 1 with its bottom pipe 12 and outlet neck 14, respectively, in communication with the bath 4 and the central opening of partition 8. It is supported in such position by welding or otherwise securing the upper end of neck 14 to partition 8.

While any suitable form of inlet may be provided for the Cyclone, a down-draft inlet extending concentrically around the up-draft outlet is preferred, because it provides maximum inlet area in minimum vertical space and, by introducing the air uniformly around the periphery of the Cyclone, insures the full utilization of practically all of the Cyclone surface for air cleaning purposes. As a result, it enables the use of a Cyclone of minimum height and correspondingly promotes compactness in the device, as a whole. Accordingly, the shoulder plate 13 is provided with an endless series of air inlet openings of desired shape and size.

To impart a swirl to the air, the shoulder plate 13 is provided with a series of downwardly slanted swirl vanes 15. Each inlet opening and each vane 15 may be simultaneously and advantageously formed by cutting the shoulder plate obliquely outward from a "zero" point (Z in Figure 2) near the neck 14 to the periphery of the plate to form the vane, and then slanting the vane downwardly about a radial axis to position the vane and form the opening. The cut or delivery edge of the vane slants downwardly and forwardly across the air flow. In the arrangement shown, each swirl vane presents a triangular surface having a peripheral edge which slants downwardly along member 11, an upstream edge which extends radially from the "zero" point to the upper end of the peripheral edge, and an air delivery edge which slants downwardly and forwardly from the "zero" point to the lower end of the peripheral edge. With the free or delivery edge of each vane slanted downwardly and forwardly, the sweep of the air is utilized to force drops of oil, which form or collect on the delivery edge, downwardly along such edge to the member 11, instead of permitting such drops either to remain and "grow" on the delivery edge until they are blown into the air stream or to bypass the Cyclone by creeping inwardly toward and ultimately passing around, the lower end of the discharge neck.

As the air flows from the casing inlet 2 toward the inlet of the Cyclone, some of the oil and solid particles will be thrown upwardly against the partition 8 and laterally against the neck 14. The sweep of the air moves these particles along such surfaces in the direction of the air flow, but the shoulder plate 13 compels them to pass laterally outward to the vaned inlet openings of the Cyclone instead of passing directly into the Cyclone. The vanes, by virtue of their shape and arrangement, thus utilize the sweep of the air to augment the lateral movement of the particles and, at the same time, impart a swirling motion to the air flow. The air and its solid and liquid particle content swirl outwardly and downwardly along the wall of the Cyclone to its bottom where the final separation, of most of the entrained particles, takes place, the particles passing downwardly through pipe 12 into the reservoir, while the relatively clean or precleaned air swirls inwardly and upwardly through the center of the Cyclone to its outlet.

To prevent the air from vortexing separated particles upwardly from the lower edge of the Cyclone, a baffle stand 16 is arranged centrally over the lower end of the Cyclone in spaced relation to its wall. This baffle extends slightly above the operating oil level and thus protects it against the vortexing action of the air.

The precleaned air, with such traces of particulate liquid and solids as may remain in it, vortexes upwardly through the neck 13 into the filtering section. In order to prevent any particulate matter, which may either creep into the neck around its lower end or be centrifuged upon it by the swirling air, from being swept into the filtering section, the outlet passage is provided with a downwardly turned overhanging flange 8a. This flange is formed by making the central opening of the partition 8 smaller than the opening of the neck with which it communicates and by downwardly turning the edge which delimits the partition opening. The overhanging flange 8a thus serves to increase the effective height of the Cyclone without necessitating or producing an increase in its actual height. The particles collecting within the neck remain there until the air flow ceases, whereupon they become free to drain into the Cyclone.

While the foregoing structure may be used to remove and recover the liquid content of air and gases, such as natural gas, it is primarily suited for use in the automotive and other air cleaning fields wherein it is desirable to introduce, into the incoming air, oil derived from the reservoir. While various well known oil entraining means may be employed, the arrangement herein shown is preferred. It includes an open-ended, cone-shaped inlet baffle 17, concentrically arranged around in outwardly spaced relation from the cycloning member 11, with its smaller end adjacent the oil bath 4 and its larger end closely fitted and rigidly secured to the wall of housing 1 adjacent the upper end of the cycloning member 11. The lower end of the baffle 17 preferably is slitted endwise at spaced points and then bent outwardly to form, around the cylindrical pipe 12 of the Cyclone, a serrated cylinder. The serrations 18 thus formed define openings of inverted V-shape, the apices of which extend above the highest oil level indicated by solid lines and the bases of which extend adjacent such level, either slightly above or below it, or coincident with it.

When the flow of air through the device is instituted, the oil level within the Cyclone will rise, while that of the reservoir proper will fall, both levels approaching the dotted line levels indicated, at the higher velocities. The lower end of baffle 17 thus cooperates with the oil bath 4, to form a variable opening, the area of which increases as the volume of flow increases. The impingement of the air against the oil forces it to assume an upwardly sloping level at the lower end of the oil elevating conduit. This impingement, together with the sweep of the air along this upwardly sloping level, causes oil to be entrained in the air. The flow of air between and under the serrations 18 create, along their inner faces, low pressure areas, which cause the air to eddy. The resulting turbulent air flow condition augments the entrainment of oil and insures a more intimate mixture of oil and air. The air, with its entrained oil content, passes upwardly through the annular passage defined by the cycloning member 11 and the inlet baffle 17. These members are shaped to converge upwardly sufficiently to prevent the flow area from increasing in the direction of the flow, and thereby maintain a flow velocity effective to carry the entrained oil upwardly through the passage. Naturally, the surfaces of member 11 and baffle 17 will become coated with oil which tends to drain downwardly, but a good portion of the oil on baffle 17 will be aspirated from the edges of the serrations 18 back into the air flow.

It is desirable to prevent buoyant particles, which have been separated by the Cyclone and conducted to the oil bath, from being entrained in the incoming air and carried back into the Cyclone. To prevent this action, a plate 19 is horizontally submerged within the oil bath at some distance above the bottom of the housing 1. This plate contains a central opening through which communication is established with the Cyclone section for the return of oil and dust to the bath. The periphery of the plate is spaced slightly from the walls of housing 1 and turned downwardly in order to form an inverted cup in which lint and other buoyant particles, received from the Cyclone, will be trapped and thus prevented from passing into the oil entraining area.

While the operation will be clear from the foregoing, it may be noted that the entering dust laden air turns downwardly to impinge against the surface of the oil or, where the level has fallen appreciably, against the oil film covering the plate 19. As a result of this impingement, the heavier dust particles are immediately coated with oil. The air, increasing in velocity as it passes under and between the serrations 18, entrains oil spray which is thoroughly mixed with the air. As the air passes upwardly between the cycloning member 11 and inlet baffle 17, it is scrubbed against their oil coated walls, an action which enhances the possibility of contact between the oil and the air borne dust particles. At the upper end of the oil elevating conduit, the air abruptly changes direction to flow downwardly into the Cyclone, the slanting vanes imparting a whirling motion to the air. The mixture of oil and air spirals downward through the Cyclone with increasing velocity, with the result that most of the dust and oil are thrown by centrifugal force against the inner walls of the Cyclone where they pass downwardly into and through the lower end of the Cyclone to the bath 4. The baffle stand 16 at the lower end of the Cyclone prevents the swirling air from re-entraining particulate matter as it turns to swirl inwardy and upwardly through the Cyclone. The air discharged by the Cyclone passes through the filter unit 6 which removes the last traces of dust and oil, before the air is discharged through outlet 3. The oil and dust, which accumulates in the filter unit, is forced laterally outwardly to the sheltered or low velocity area, near the circumference of the unit, where it becomes free to drain through chamber 9 and pipe 10 back to the reservoir. This oil serves to keep the filter unit coated and clean. The heavier particles removed by the Cyclone, settle to the bottom of the reservoir, while the lighter particles tend to float to the top, but are intercepted by the inverted cup formed by plate 19.

Having described my invention, I claim:

1. An air filter for removing particulate matter, including entrained liquid, from a flow of air comprising: a liquid reservoir; a double vortex Cyclone—composed of a conical casing open at its smaller lower end and provided at its larger upper end with an axial outlet and an outlying swirl-producing inlet—arranged with its lower end in communication with said reservoir; a medium for filtering the air discharged from said Cyclone, said medium having its lower end in communication with the Cyclone outlet; means for blanking off a portion of the lower end of said medium from the air flow to shelter an overlying portion of the medium; and conduit means connecting the lower end of said sheltered portion to said liquid reservoir.

2. An air cleaner comprising: a housing having a liquid reservoir section, a superposed filtering section, an interposed Cyclone section, an air inlet in the Cyclone section and an air outlet in the filtering section; a double vortex Cyclone—composed of a conical casing open at its smaller lower end and provided at its larger upper end with an axial outlet and an outlying swirl-producing inlet—arranged within the Cyclone section to centrifuge air passing from said housing air inlet into said filtering section, the lower end of said Cyclone extending into and communicating with said reservoir; a filter medium arranged in said filtering section to filter the upwardly moving air passing from said Cyclone to said housing air outlet; means blanking off a portion of the lower end of said medium from the air flow to shelter an overlying portion of the medium; and conduit means connecting the lower end of said sheltered portion to the lower end of said Cyclone at a point below the operating level of the liquid therein.

3. The air cleaner of claim 2 wherein: the blanking means comprises: partition means secured to and extending across said housing between Cyclone and filter sections to define a central opening, through which said Cyclone discharges, and the bottom of a surrounding drainage chamber, into which liquid separated by the filtering medium drains; the conduit means being connected to the drainage chamber.

4. An air cleaner comprising: a housing having a liquid reservoir section, a superposed filtering section, an interposed Cyclone section, an air inlet in the Cyclone section and an air outlet in the filtering section; filtering means within the filtering section for filtering the air passing to said housing outlet; a double vortex Cyclone—composed of a conical casing open at its smaller lower end and provided at its larger upper end with an axial outlet and an outlying swirl-producing inlet—arranged within the Cyclone section to centrifuge air passing into the filtering section, the lower end of said Cyclone communicating with said reservoir; partition means extending across the housing between Cyclone and filtering sections to define a central opening through which said sections communicate and a surrounding drainage chamber into which the filtering means drains; and drainage return means connecting the drainage chamber with said reservoir.

5. The air cleaner of claim 4 wherein: the filtering means is removably supported on said partition means; the Cyclone outlet is in the form of a neck; and the Cyclone is secured through its neck to depend from said partition means.

6. An air cleaner comprising: a housing having a liquid reservoir section, a superposed Cyclone section, and air inlet and outlet openings; a double vortex Cyclone—composed of a conical casing open at its smaller lower end and provided at its larger upper end with an axial outlet and an outlying swirl-producing inlet—arranged within the Cyclone section to centrifuge air passing between said housing openings, the lower end of said Cyclone communicating with said reservoir; and an annular conical baffle extending around said Cyclone and cooperating with it to define an upwardly extending passage having an upper end which communicates with the Cyclone inlet and a lower end which cooperates with the reservoir to form a variable liquid entraining opening communicating with said housing air inlet.

7. The air cleaner defined in claim 6, wherein the cooperating passage-defining surfaces of Cyclone and baffle converge upwardly sufficiently to avoid any appreciable increase in the flow area of said upwardly extending passage in the direction of flow.

8. An air cleaner for removing particulate matter, including entrained liquid, from a flow of air comprising: a housing having a liquid reservoir section, a superposed Cyclone section, and air inlet and outlet openings for said air flow; a double vortex Cyclone—composed of a conical casing open at its smaller lower end and provided at its larger upper end with an axial outlet and an outlying swirl-producing inlet—vertically arranged within the Cyclone section to centrifuge the air flow passing between housing openings, the lower end of said Cyclone communicating with and directing into the reservoir particulate matter removed from the air flow; a plate horizontally arranged within the reservoir section below the static liquid level thereof with its peripheral edge slightly spaced from the walls of the housing and downwardly turned to form an inverted chamber for trapping and holding particulate matter of a buoyant nature, said plate having a central opening through which the lower end of the Cyclone extends; and means for introducing liquid from said reservoir into said air flow in advance of said Cyclone, said means including an annular conical baffle extending around said Cyclone and cooperating with it to define an upwardly extending passage having an upper end which communicates with the Cyclone inlet and a lower end which cooperates with the reservoir liquid overlying said plate to form a variable liquid entraining opening communicating with said housing air inlet.

9. The structure defined in claim 2, wherein: a centrally arranged hollow neck provides the upwardly directed Cyclone outlet passage and cooperates with the outer Cyclone wall to define a surrounding downwardly directed inlet therefor; an endless series of swirl vanes extending laterally across said downwardly directed inlet; and means associated with said neck to form an endless downwardly turned flange overhanging the Cyclone outlet passage.

10. The air cleaner of claim 1 wherein: an annular conical baffle extends around said Cyclone and cooperates with it to define an upwardly extending passage having an upper end which communicates with the Cyclone inlet and a lower end which cooperates with the reservoir to form a variable liquid entraining air inlet opening.

11. The air cleaner of claim 4 wherein: an annular conical baffle extends around said Cyclone and cooperates with it to define an upwardly extending passage, the upper end of which communicates with the Cyclone inlet and the lower end of which cooperates with the reservoir to form a variable liquid entraining opening communicating with said housing air inlet.

12. The air cleaner of claim 1 wherein: a plate is horizontally arranged within the reservoir section below the static liquid level thereof with its outer edge slightly spaced from the walls of the reservoir and downwardly turned, said plate having a central opening through which the lower end of the Cyclone extends; and an annular conical baffle extends around said Cyclone and cooperates with it to define an upwardly extending passage having an upper end which communicates with the Cyclone inlet and a lower end which cooperates with the reservoir liquid overlying said plate to form a variable liquid entraining air inlet opening.

13. The air cleaner of claim 4 wherein: an annular conical baffle extends around said Cyclone and cooperates with it to define an upwardly extending passage, the upper end of which communicates with the Cyclone inlet, and the lower end of which cooperates with the reservoir to form a variable liquid entraining opening communicating with said casing air inlet; and a plate is horizontally arranged within the reservoir section and adjacent the lower end of said variable opening, to form an inverted cup extending around the lower end of said Cyclone.

HOWARD M. FITCH.